United States Patent Office 3,479,253
Patented Nov. 18, 1969

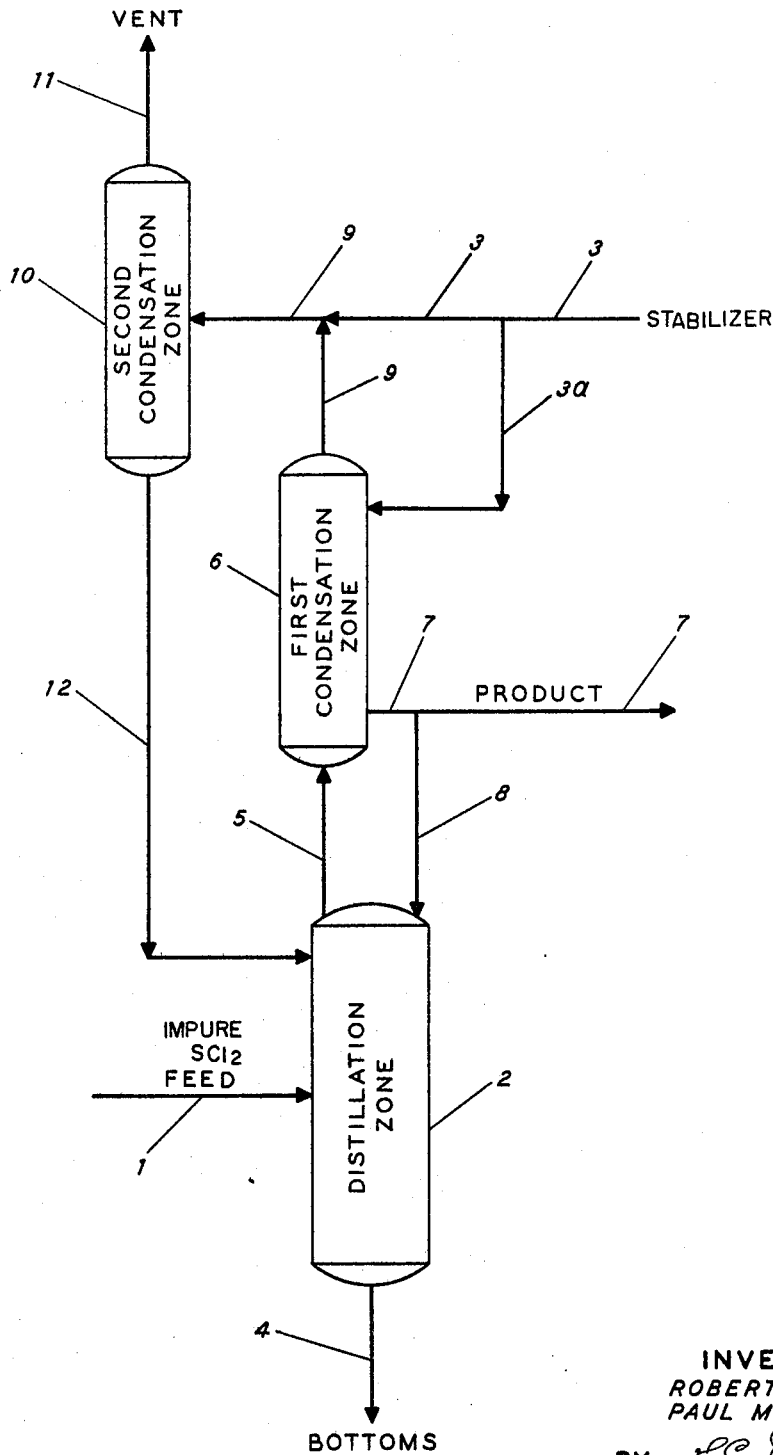

3,479,253
CONTINUOUS DISTILLATION OF SULFUR DI-
CHLORIDE-SULFUR MONOCHLORIDE TO
RECOVER PURE SULFUR DICHLORIDE
Robert J. Hinds, Orinda, and Paul M. Premo, Mill Valley,
Calif., assignors to Chevron Research Company, San
Francisco, Calif., a corporation of Delaware
Filed Mar. 29, 1967, Ser. No. 626,790
Int. Cl. B01d 3/34, 5/00
U.S. Cl. 203—6                                    7 Claims

ABSTRACT OF THE DISCLOSURE

Separation of a mixture containing about 50 to 70 weight percent sulfur dichloride, sulfur monochloride and at least about 1 part of chlorine per 100 parts of sulfur dichloride into a sulfur monochloride enriched phase and an essentially pure sulfur dichloride phase by distilling the mixture in the presence of a sulfur dichloride stabilizer in a distillation column at superatmospheric pressure and an overhead temperature of about 150 to 200° F., withdrawing the sulfur monochloride phase as bottoms, partially condensing the overhead vapors in a first condenser at 130 to 160° F., 10 to 20 p.s.i.a., withdrawing the essentially pure sulfur dichloride phase as condensate from the first condenser, passing the uncondensed portion of the overhead to a second condenser at 40 to 120° F., 10 to 20 p.s.i.a. and returning the condensate from the second condenser to the distillation column.

Invention background

Sulfur dichloride is used to prepare tetrachloroethyl sulfenyl chloride. This dichloride may be prepared by chlorinating sulfur monochloride according to the following equation:

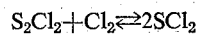

$$S_2Cl_2 + Cl_2 \rightleftarrows 2SCl_2$$

The equilibrium of this reaction is such that at the normal temperature and pressure used for the reaction a mixture is obtained which contains roughly 50 to 70 weight percent sulfur dichloride. A typical reaction product contains about 50 to 55 weight percent sulfur dichloride, about 40 to 45 weight percent sulfur monochloride and at least about 1 part of chlorine per 100 parts of sulfur dichloride. Such mixtures are not suitable for use in preparing 1,1,2,2-tetrachloroethylsulfenyl chloride since both chlorine and sulfur monochloride promote undesirable side reactions in the sulfenyl chloride synthesis. Consequently, it is desirable to purify this mixture to a material which contains less than about 0.5 weight percent chlorine and less than about 2 weight percent sulfur monochloride.

Sulfur monochloride may be separated from such mixtures by distillation. While the distillation can be carried out at subatmospheric and atmospheric pressure, superatmospheric pressures in the range of about 1 to about 35 p.s.i.g. will normally be employed. The distillation will have a maximum bottoms temperature of about 350° F. and a maximum overhead temperature of about 200° F. Under usual operating conditions, the bottoms temperature will be in the range of about 270 to 300° F. while the overhead temperature will be in the range of about 150 to 160° F. Sulfur dichloride stabilizer such as a trialkyl phosphite, phosphorous pentachloride or trialkyl phosphate may be advantageously used in the distillation. Such stabilizers inhibit the decomposition of sulfur dichloride into sulfur monochloride and chlorine. They will normally be present in amounts ranging from about 0.05 to 5 parts per 1000 parts of sulfur dichloride.

The bottoms from the distillation is sulfur monochloride containing a trace of sulfur dichloride and stabilizer. It may be returned as feed to the chlorination vessel if desired.

The overhead vapors from the distillation comprise an enriched sulfur dichloride phase containing more than about 0.5 weight percent chlorine, usually about 1 to 2 weight percent chlorine and sulfur monochloride. With this much chloride, the overhead is not considered suitable for making tetrachloroethylsulfenyl chloride. Furthermore, a conventional condensation of these overhead vapors does not give a sufficient separation of sulfur dichloride from chlorine. For instance, if the overhead was passed to a condenser at 138° F. (essentially the normal boiling point of sulfur dichloride), atmospheric pressure and held for a normal residence time, about 2.5% or more sulfur dichloride decomposition would occur. Varying the condensing temperature or pressure does not overcome this problem. If lower temperatures are used, too much chlorine will condense; if higher temperatures are used, less sulfur dichloride will be condensed and the decomposition of sulfur dichloride will be greater.

Invention description

It has now been discovered that sulfur dichloride containing less than about 0.5% by weight chlorine may be produced in excellent yields from the overhead vapors of the above-described distillation by using a unique two-stage condensing operation.

According to this novel method, the overhead vapors from the distillation zone are partially condensed in a first condensation zone maintained at about 130° to 160° F. and about 10 to 20 p.s.i.a. The condensate, comprising an essentially pure sulfur dichloride product containing less than about 0.5 weight percent chlorine and less than about 2 weight percent sulfur monochloride is withdrawn from the first condensation zone. The uncondensed portion of the overhead is then passed from the first condensation zone to a second condensation zone kept at about 40 to 120° F. and about 10 to 20 p.s.i.a. Substantially all the sulfur dichloride remaining in the overhead is condensed in the second zone along with some chlorine. The condensate from the second zone is withdrawn and recycled to the uppermost portion of the distillation zone. A major portion, usually about 70 weight percent of the vapor phase of the second condensation zone is chlorine. This vapor phase may be vented to a scrubber or used as feed to the chlorination reactor. It is desirable to carry out both condensations in the presence of a sulfur dichloride stabilizer, preferably a trialkylphosphate.

Preferred temperatures and pressures for the first condensation zone are 135 to 150° F. and 0 to 5 p.s.i.g. Preferred temperatures and pressures for the second condensation zone are 70 to 100° F. and 0 to 5 p.s.i.g. Residence times in both condensation zones are not critical. However, they should be kept as short as possible in order to limit sulfur dichloride decomposition. Preferably, they will be less than about 3 minutes.

Sulfur dichloride decomposition is catalyzed by metals such as iron and its alloys. Therefore, it is desirable to carry out the distillation and condensation in apparatus in which the materials do not come into contact with such metals. For instance, glass-lined apparatus may be used.

In a continuous distillation using this method, a portion of the essentially pure sulfur dichloride withdrawn as condensate from the first condensation zone will be returned to the distillation zone at a point above the uppermost plate or packing. Reflux ratios in the range of 0.1:1 to 10:1 are suitable for such operation. A reflux ratio of about 1:1 is preferred.

Examples

The following are offered to illustrate method of this invention and its improvement over conventional methods. They are offered only by way of illustration and are not meant to limit the invention described herein.

Example 1

The method of this invention may be carried out as illustrated on the attached drawing. Referring to the drawing a mixture comprising 292.8 parts sulfur dichloride, 239.1 parts sulfur monochloride and 3.0 parts chlorine at 90° F. and 5 p.s.i.g. are fed through line 1 into distillation zone 2. Distillation zone 2 is a glass-lined distillation column having 8 theoretical plates. The bottoms temperature of distillation zone 2 is 280° F., the overhead temperature is 153° F. and the pressure is 2 p.s.i.g. Triethylphosphate, 0.3 part, is fed through lines 3 and 3a to condensation zones 6 and 10.

Bottoms product comprising 234.3 parts sulfur monochloride, 4.8 parts sulfur dichloride and 0.3 part triethyl phosphate are withdrawn from distillation zone 2 through line 4.

The overhead vapors from distillation zone 1 comprising 12 parts sulfur monochloride, 635.1 parts sulfur dichloride and 9 parts chlorine are passed via line 5 into condensation zone 6. Condensation zone 6 is a conventional condenser filled with cooling means. The overhead vapors are cooled to 138° F., 1 p.s.i.g. in condensation zone 6. Residence time is about 1 to 2 minutes. The condensate from zone 6 comprising 12 parts sulfur monochloride, 570.6 parts sulfur dichloride and 3 parts chlorine is withdrawn from zone 6 through line 7. This condensate is split and half is returned through line 8 to distillation zone 2 and the other half is withdrawn as product through line 7. The vapor phase in condensation zone 6, comprising 64.5 parts sulfur dichloride and 6 parts chlorine is passed through line 9 to a second condensation zone 10. These vapors are cooled in zone 10 to 90° F., 0.3 p.s.i.g. Residence time is about 1–2 minutes. The condensate from zone 10, 63.6 parts sulfur dichloride and 3.9 parts chlorine is withdrawn from zone 10 and returned to distillation zone 2 through line 12. The vapor phase in zone 10, comprising 0.9 part sulfur dichloride and 2.1 parts chlorine is vented through line 11.

Examples 2 and 3 illustrate the improvement of the invention process over conventional condensation methods.

Example 2

As described in Example 1 a mixture of sulfur dichloride, sulfur monochloride and chlorine is distilled into a sulfur monochloride enriched bottoms phase and a sulfur dichloride enriched overhead vapor phase. However, instead of condensing the overhead vapors in two stages as described in Example 1, the vapors are cooled to 125° F., 0.3 p.s.i.g. in a single condensation zone. The product condensate contains about 1.4 weight percent chlorine which is not suitable for use in preparing 1,1,2,2-tetrachloroethylsulfenyl chloride.

Example 3

As described in Example 1 a mixture of sulfur dichloride, sulfur monochloride and chlorine is distilled into a sulfur monochloride enriched bottoms phase and a sulfur dichloride enriched overhead vapor phase. However, instead of condensing the overhead vapors in two stages as described in Example 1, the vapors are cooled to 138° F., 0.3 p.s.i.g. in a single condensation zone. About 10% of the sulfur dichloride in the feed mixture is not condensed under these conditions.

As will be evident to those skilled in the art, various modifications on this invention can be made or followed, in the light of the foregoing disclosure and discussion, without departing from the spirit or scope of the disclosure or from the scope of the following claims.

We claim:
1. In the continuous distillation of a composition comprising about 50 to 70 weight percent sulfur dichloride, sulfur monochloride and at least about 1 part of chlorine per 100 parts of sulfur dichloride in the presence of a sulfur dichloride stabilizer into a sulfur monochloride enriched bottoms phase and a sulfur dichloride enriched overhead vapor phase in a distillation zone having a maximum overhead temperature of about 200° F. and a maximum bottoms temperature of about 350° F., the improvement which comprises partially condensing said overhead vapor phase in a first condensation zone maintained at about 130° to 160° F. and about 10 to 20 p.s.i.a., withdrawing an essentially pure sulfur dichloride product containing less than about 0.5 weight percent chlorine and less than about 2 weight percent sulfur monochloride as condensate from said first condensation zone, a passing the uncondensed portion of said overhead vapor phase to a second condensation zone maintained at about 40° to 120° F. and about 10 to 20 p.s.i.a. and returning the condensate from said second condensation zone to said distillation zone.

2. The distillation of claim 1 wherein the overhead temperature of the distillation zone is in the range of about 150 to 160° F., the first condensation zone is maintained at about 135 to 150° F. and 10 to 20 p.s.i.a. and the second condensation zone is maintained at about 70 to 100° F. and 10 to 20 p.s.i.a.

3. The distillation of claim 1 wherein the sulfur dichloride stabilizer is present in amounts ranging from about 0.05 to 5 parts per 1,000 parts of sulfur dichloride.

4. The distillation of claim 1 wherein the sulfur dichloride stabilizer is trialkylphosphate.

5. The distillation of claim 1 in which the distillation is carried out continuously and a portion of the condensate product withdrawn from the first condensation zone is returned to the distillation zone at a reflux ratio in the range of 0.1:1 and 10:1.

6. The distillation of claim 5 wherein the reflux ratio is about 1:1.

7. In the continuous distillation of a composition comprising about 50 to 55 weight percent sulfur dichloride, about 40 to 45 weight percent sulfur monochloride and at least about 1 part chlorine per 100 parts of sulfur dichloride in the presence of 0.05 to 5 parts triethylphosphate per 1000 parts of sulfur dichloride into a sulfur monochloride enriched bottoms phase and a sulfur dichloride enriched overhead vapor phase in a distillation zone having an overhead temperature in the range of about 150 to 160° F. and a maximum bottoms temperature of about 350° F., the improvement comprising partially condensing the overhead vapor phase in a first condensation zone at about 135 to 150° F. and 10 to 20 p.s.i.a., withdrawing an essentially pure sulfur dichloride product containing less than about 0.5 weight percent chlorine and less than about 2 weight percent sulfur monochloride as condensate from the first condensation zone, returning a portion of said product to the uppermost portion of the distillation zone at a reflux ratio of about 1:1, passing the uncondensed portion of the overhead vapor phase to a second condensation zone maintained at about 70 to 100° F. and 10 to 20 p.s.i.a., and returning the condensate from said second condensation zone to said distillation zone.

References Cited

UNITED STATES PATENTS

| | | | |
|---|---|---|---|
| 961,530 | 6/1910 | Quayle | 23—205 |
| 1,341,423 | 5/1920 | Gegenheimer et al. | 23—205 |
| 1,923,094 | 8/1933 | Jenness. | |
| 3,205,040 | 9/1965 | Schmadebeck | 23—205 |
| 3,071,441 | 1/1963 | Schmadebeck | 23—205 |
| 3,071,442 | 1/1963 | Schmadebeck | 23—205 |
| 3,219,413 | 11/1965 | Kunkel et al. | 23—205 |
| 1,730,892 | 10/1929 | Leslie | 203—98 X |
| 2,617,758 | 11/1952 | Massiot | 203—87 |

FOREIGN PATENTS

| | | |
|---|---|---|
| 1,433,953 | 2/1966 | France. |

NORMAN YUDKOFF, Primary Examiner

F. E. DRUMMOND, Assistant Examiner

U.S. Cl. X.R.

23—205; 203—60, 87